(12) United States Patent
Wei et al.

(10) Patent No.: US 8,563,840 B2
(45) Date of Patent: Oct. 22, 2013

(54) APPARATUS FOR MAKING CARBON NANOTUBE COMPOSITE WIRE STRUCTURE

(75) Inventors: Yang Wei, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 12/979,519

(22) Filed: Dec. 28, 2010

(65) Prior Publication Data

US 2012/0043004 A1 Feb. 23, 2012

(30) Foreign Application Priority Data

Aug. 23, 2010 (CN) .......................... 2010 1 0259952

(51) Int. Cl.
*D02G 3/36* (2006.01)
(52) U.S. Cl.
USPC .......................................... 977/842; 977/840
(58) Field of Classification Search
USPC .................................................. 977/840, 842
See application file for complete search history.

(56) References Cited

U.S. PATENT DOCUMENTS

| | | | |
|---|---|---|---|
| 4,389,837 A * | 6/1983 | Stahlecker et al. ............... 57/16 |
| 7,550,907 B2 | 6/2009 | Jiang et al. |
| 7,741,765 B2 | 6/2010 | Liu et al. |
| 2003/0012721 A1 | 1/2003 | Nakayama et al. |
| 2007/0237952 A1 | 10/2007 | Jiang et al. |
| 2008/0170982 A1 | 7/2008 | Zhang et al. |
| 2008/0254675 A1 | 10/2008 | Lee et al. |
| 2009/0134772 A1 | 5/2009 | Wei et al. |
| 2009/0194313 A1 | 8/2009 | Jiang et al. |
| 2009/0197082 A1 | 8/2009 | Jiang et al. |
| 2009/0255706 A1 | 10/2009 | Jiang et al. |
| 2009/0301993 A1 | 12/2009 | Feng et al. |
| 2010/0055338 A1 | 3/2010 | Kim et al. |
| 2010/0104808 A1 | 4/2010 | Fan et al. |
| 2010/0124622 A1 | 5/2010 | Wang et al. |
| 2010/0329501 A1 | 12/2010 | Liu et al. |

FOREIGN PATENT DOCUMENTS

| | | |
|---|---|---|
| JP | P2008-277077 A | 11/2008 |
| JP | 2009-117367 | 5/2009 |

* cited by examiner

*Primary Examiner* — Natalia Levkovich
(74) *Attorney, Agent, or Firm* — Altis & Wispro Law Group, Inc.

(57) ABSTRACT

An apparatus for making a carbon nanotube composite structure includes a supply unit, a wrapping unit, and a collecting unit. The supply unit is configured to supply a linear structure. The wrapping unit includes a drive mechanism, a hollow rotating shaft, and a face plate. The drive mechanism is mounted on a first end of the hollow rotating shaft to drive the hollow rotating shaft. The face plate is fixed on a second end of the hollow rotating shaft and loads a carbon nanotube array with a growing substrate. The carbon nanotube array forms a carbon nanotube structure. The wrapping unit winds the carbon nanotube structure around the linear structure. The collecting unit pulls the linear structure and collects the carbon nanotube composite wire structure.

18 Claims, 11 Drawing Sheets

APPARATUS FOR MAKING CARBON NANOTUBE COMPOSITE WIRE STRUCTURE

RELATED APPLICATIONS

This application claims all benefits accruing under 35 U.S.C. §119 from China Patent Application No. 201010259952.7, filed on Aug. 23, 2010 in the China Intellectual Property Office, the disclosure of which is incorporated herein by reference. This application is related to applications entitled "CARBON NANOTUBE WIRE STRUCTURE AND METHOD FOR MAKING THE SAME", filed Dec. 25, 2010 (Ser No. 12/978,548); "MARCOSCOPIC CARBON NANOTUBE TUBE STRUCUTE AND METHOD FOR MAKING THE SAME", filed Mar. 9, 2011 (Ser. No. 13/043,478); "CARBON NANOTUBE COMPOSITE WIRE STRUCTURE AND METHOD FOR MAKING THE SAME", Dec. 28, 2010 (Ser. No. 12/979,454) and "CARBON NANOTUBE COMPOSITE TUBE STRUCTURE AND METHOD FOR MAKING THE SAME", filed Jul. 18, 2011 (Ser. No. 13/185,296).

BACKGROUND

1. Technical Field

The present disclosure relates to an apparatus for making a carbon nanotube composite wire structure.

2. Discussion of Related Art

Carbon nanotubes can be composed of a plurality of coaxial cylinders of graphite sheets. Carbon nanotubes have received a great deal of interest since the early 1990s. Carbon nanotubes have interesting and potentially useful electrical and mechanical properties. Due to these and other properties, carbon nanotubes have become a significant focus of research and development for use in electron emitting devices, sensors, transistors, and other devices.

It is becoming increasingly popular for carbon nanotubes to be used to make composite materials. Composites of carbon nanotubes and metals, semiconductors, or polymers have qualities of the materials used in the composite. Generally, a carbon nanotube metal composite includes metal particles and carbon nanotubes. The method for producing the carbon nanotube metal composite includes a stirring step or a vibration step of distributing the carbon nanotubes in the metal particles, or includes a step of dispersing the metal particles in a carbon nanotube film or a carbon nanotube wire including the carbon nanotubes. However, the metal particles in the carbon nanotube metal composite are in metal powder form. The method for making the carbon nanotube metal composite is complicated and may be harmful to the environment.

What is needed, therefore, is to provide a carbon nanotube composite wire structure, a method for making the same, and an apparatus for making the same, to overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

A carbon nanotube composite wire structure includes a conductive thread structure and a carbon nanotube layer wrapped around the conductive thread structure. The carbon nanotube layer is a consecutive structure and wound on the conductive thread structure from one end of the conductive thread structure to the other end of the conductive thread structure. The carbon nanotube layer comprises a plurality of carbon nanotubes. The carbon nanotubes are connected via van der Waals force therebetween, and are uniformly located on the entire surface of the conductive thread structure along an axis of the conductive thread structure.

The conductive thread structure is configured to support the carbon nanotubes, thus the conductive thread structure should have a certain strength and toughness. The conductive thread structure can be a consecutive structure with a large length-diameter ratio. The conductive thread structure can have a fixed shape. The cross-section of the conductive thread structure can be circle-shaped, triangle-shaped, rectangle-shaped or ellipse-shaped. The material of the conductive thread structure can be metal. The metal can be gold, silver, copper, aluminum, or an alloy such as copper-tin alloys. The conductive thread structure can be a metal thread or a metal string. The conductive thread structure can also be a conductive composite thread structure, such as coating an aluminum layer on a surface of copper-tin alloys thread, or plating a metal layer on a fiber thread. A diameter of the conductive thread structure can be selected as desired. In one embodiment, the conductive thread structure is a gold thread with a diameter of about 18 microns (μm), or an aluminum thread with a diameter of about 25 μm.

The carbon nanotube layer can be formed by a carbon nanotube structure tightly wrapping around the conductive thread structure along the axis of the conductive thread structure. The carbon nanotube layer can be a free-standing structure wrapping the entire surface of the conductive thread structure. In one embodiment, the carbon nanotube composite wire structure comprises the conductive thread structure and the carbon nanotube structure wrapping the entire surface of the conductive thread structure.

The carbon nanotube structure comprises a plurality of carbon nanotubes and can be orderly or disorderly aligned. The disorderly aligned carbon nanotubes are carbon nanotubes arranged along many different directions, such that the number of carbon nanotubes arranged along each different direction can be almost the same (e.g. uniformly disordered), and/or entangled with each other. The orderly aligned carbon nanotubes are carbon nanotubes arranged in a consistently systematic manner, e.g., most of the carbon nanotubes are arranged approximately along a same direction or have two or more sections with most of the carbon nanotubes arranged approximately along a same direction (different sections can have different directions). The carbon nanotubes can be single-walled, double-walled, and/or multi-walled carbon nanotubes. The diameters of the single-walled carbon nanotubes range from about 0.5 nanometers (nm) to about 50 nm. The diameters of the double-walled carbon nanotubes range from about 1 nm to about 50 nm. The diameters of the multi-walled carbon nanotubes range from about 1.5 nm to about 50 nm.

The free-standing carbon nanotube structure may have a planar shape or a linear shape. The carbon nanotube structure can include at least one carbon nanotube film, at least one carbon nanotube wire structure, or the combination of the carbon nanotube film and the carbon nanotube wire structure.

Figure 1:
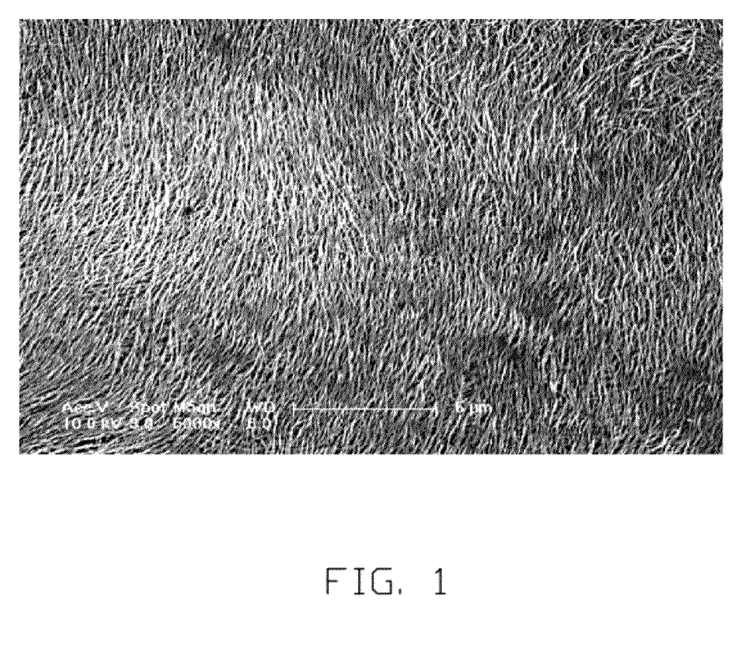
FIG. 1 shows a scanning electron microscope (SEM) image of a pressed carbon nanotube film.

Referring to FIG. 1, the carbon nanotube film can also be a pressed carbon nanotube film formed by pressing a carbon nanotube array down on the substrate. The carbon nanotubes in the pressed carbon nanotube array are arranged along a same direction or along different directions. The carbon nanotubes in the pressed carbon nanotube array can rest upon each other. Adjacent carbon nanotubes are attracted to each other and combined by van der Waals attractive force. An angle between a primary alignment direction of the carbon nanotubes and a surface of the pressed carbon nanotube array is about 0 degrees to approximately 15 degrees. The greater the pressure applied, the smaller the angle obtained. If the carbon nanotubes in the pressed carbon nanotube array are arranged along different directions, the carbon nanotube structure can be isotropic. The thickness of the pressed carbon nanotube array can range from about 0.5 nm to about 1 mm. The length of the carbon nanotubes can be larger than 50 µm. Clearances can exist in the carbon nanotube array. Therefore, micropores can exist in the pressed carbon nanotube array and be defined by the adjacent carbon nanotubes. Examples of the pressed carbon nanotube film are taught by US PGPub. 20080299031A1 to Liu et al.

Figure 2:
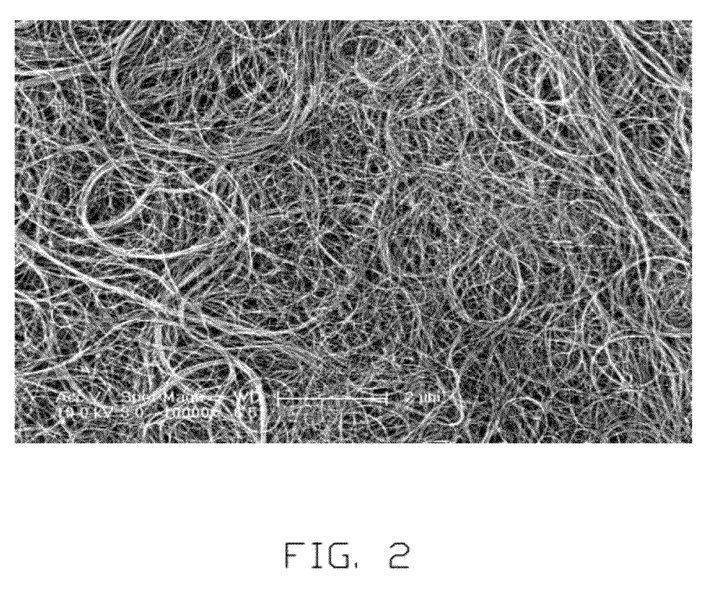
FIG. 2 shows an SEM image of a flocculated carbon nanotube film.

Referring to FIG. 2, the carbon nanotube film can be a flocculated carbon nanotube film formed by a flocculating method. The flocculated carbon nanotube film can include a plurality of long, curved, disordered carbon nanotubes entangled with each other. A length of the carbon nanotubes can be greater than 10 centimeters. In one embodiment, the length of the carbon nanotubes is in a range from about 200 microns to about 900 µm. Further, the flocculated carbon nanotube film can be isotropic. Here, "isotropic" means the carbon nanotube film has properties identical in all directions substantially parallel to a surface of the carbon nanotube film. The carbon nanotubes can be substantially uniformly distributed in the carbon nanotube film. The adjacent carbon nanotubes are acted upon by the van der Waals attractive force therebetween, thereby forming an entangled structure with micropores defined therein. The thickness of the flocculated carbon nanotube film can range from about 1 µm to about 1 millimeter (mm) In one embodiment, the thickness of the flocculated carbon nanotube film is about 100 µm.

Figure 3:
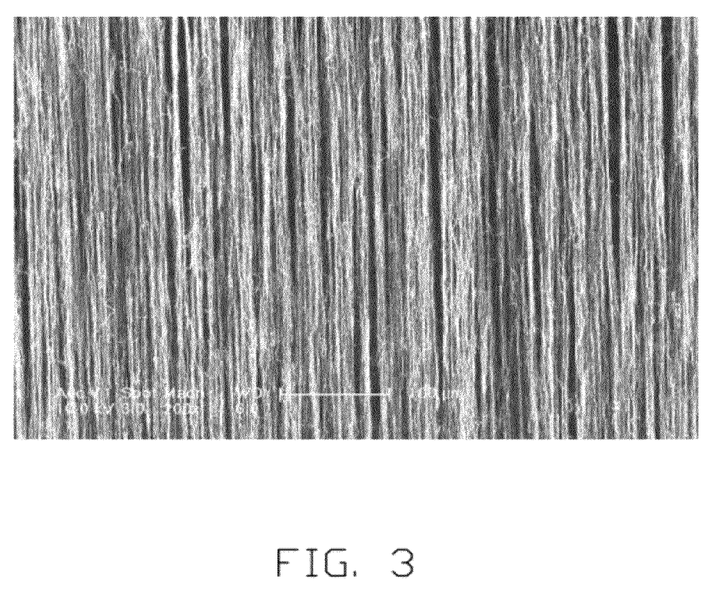
FIG. 3 shows an SEM image of a drawn carbon nanotube film.

Referring to FIG. 3, the carbon nanotube film can also be a drawn carbon nanotube film formed by drawing a film from a carbon nanotube array. Examples of the drawn carbon nanotube film are taught by U.S. Pat. No. 7,045,108 to Jiang et al. The thickness of the drawn carbon nanotube film can be in a range from about 0.5 nm to about 100 µm.

The drawn carbon nanotube film includes a plurality of carbon nanotubes that are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. It can be appreciated that some variation can occur in the orientation of the carbon nanotubes in the drawn carbon nanotube film. Microscopically, the carbon nanotubes oriented substantially along the same direction may not be perfectly aligned in a straight line, and some curve portions may exist. It can be understood that contact between some carbon nanotubes located substantially side by side and oriented along the same direction cannot be totally excluded.

More specifically, the drawn carbon nanotube film can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity, and shape. The carbon nanotubes in the drawn carbon nanotube film are also substantially oriented along a preferred orientation. The width of the drawn carbon nanotube film relates to the carbon nanotube array from which the drawn carbon nanotube film is drawn.

The carbon nanotube structure can include more than one drawn carbon nanotube film. An angle can exist between the orientation of the carbon nanotubes in adjacent films, stacked, and/or coplanar. Adjacent carbon nanotube films can be combined by only the van der Waals attractive force therebetween without the need of an additional adhesive. An angle between the aligned directions of the carbon nanotubes in two adjacent drawn carbon nanotube films can range from about 0 degrees to about 90 degrees. Spaces are defined between two adjacent carbon nanotubes in the drawn carbon nanotube film. If the angle between the aligned directions of the carbon nanotubes in adjacent drawn carbon nanotube films is larger than 0 degrees, the micropores can be defined by the crossed carbon nanotubes in adjacent drawn carbon nanotube films.

The carbon nanotube wire structure can also include at least one carbon nanotube wire. If the carbon nanotube wire structure includes a plurality of carbon nanotube wires, the carbon nanotube wires can be substantially parallel to each other to form a bundle-like structure or twisted with each other to form a twisted structure. The bundle-like structure and the twisted structure are two kinds of linear shaped carbon nanotube structures.

Figure 4:
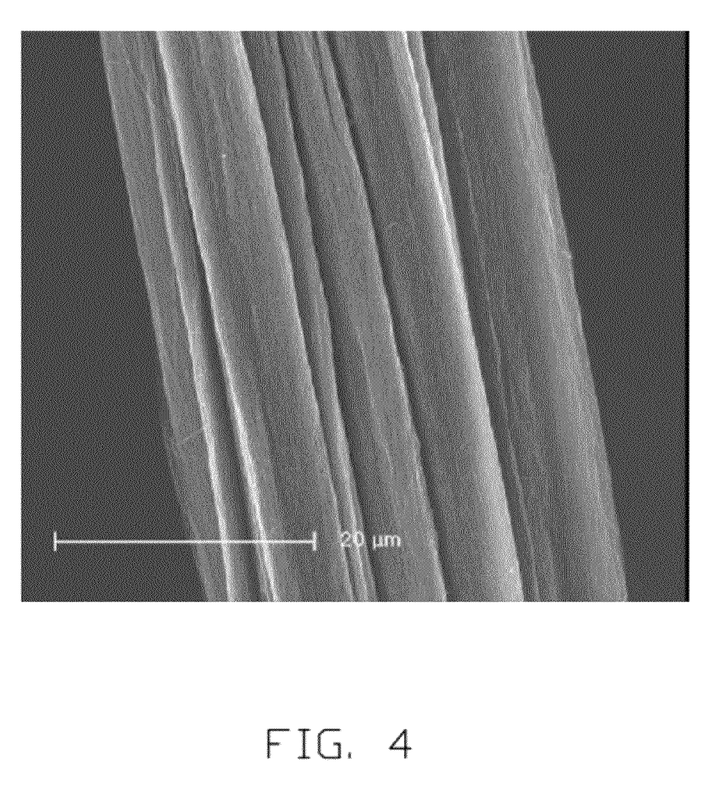
FIG. 4 shows an SEM image of an untwisted carbon nanotube wire.

The carbon nanotube wire itself can be untwisted or twisted. Referring to FIG. 4, treating the drawn carbon nanotube film with a volatile organic solvent can obtain the untwisted carbon nanotube wire. In one embodiment, the organic solvent is applied to soak the entire surface of the drawn carbon nanotube film. During the soaking, adjacent substantially parallel carbon nanotubes in the drawn carbon nanotube film will bundle together, due to the surface tension of the organic solvent as it volatilizes, and thus the drawn carbon nanotube film will be shrunk into an untwisted carbon nanotube wire. The untwisted carbon nanotube wire includes a plurality of carbon nanotubes substantially oriented along a same direction (i.e., a direction along the length direction of the untwisted carbon nanotube wire). The carbon nanotubes are substantially parallel to the axis of the untwisted carbon nanotube wire. In one embodiment, the untwisted carbon nanotube wire includes a plurality of successive carbon nanotubes joined end to end by van der Waals attractive force therebetween. A length of the untwisted carbon nanotube wire can be arbitrarily set as desired. A diameter of the untwisted carbon nanotube wire ranges from about 0.5 nm to about 100 μm. Examples of the untwisted carbon nanotube wire are taught by US patent application Publication US 2007/0166223 to Jiang et al.

Figure 5:
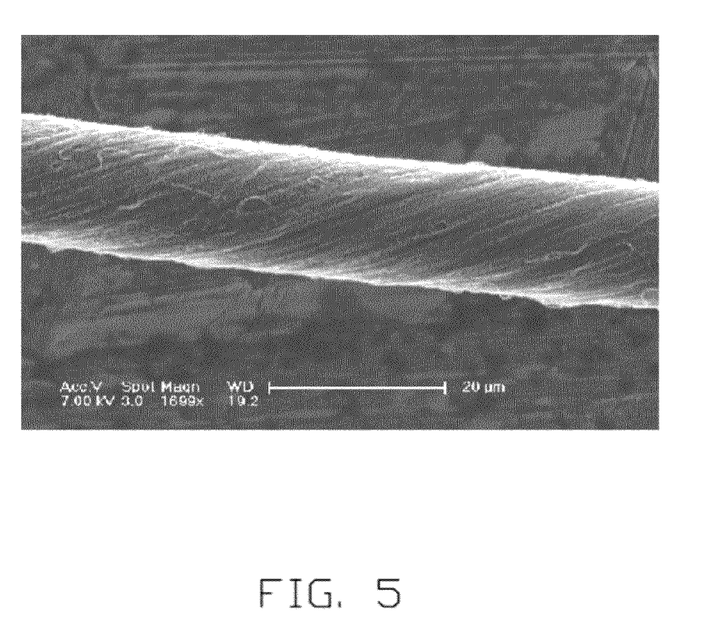
FIG. 5 shows an SEM image of a twisted carbon nanotube wire.

Referring to FIG. 5, the twisted carbon nanotube wire can be obtained by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire. In one embodiment, the twisted carbon nanotube wire includes a plurality of successive carbon nanotubes joined end to end by van der Waals attractive force therebetween. The length of the carbon nanotube wire can be set as desired. A diameter of the twisted carbon nanotube wire can be from about 0.5 nm to about 100 μm.

The twisted carbon nanotube wire can be treated with a volatile organic solvent, before or after being twisted. After being soaked by the organic solvent, the adjacent substantially parallel carbon nanotubes in the twisted carbon nanotube wire will bundle together, due to the surface tension of the organic solvent when the organic solvent volatilizes. The specific surface area of the twisted carbon nanotube wire will decrease, and the density and strength of the twisted carbon nanotube wire will be increased.

If the carbon nanotube layer comprises drawn carbon nanotube films or untwisted carbon nanotube wires, the carbon nanotube composite wire structure can include the conductive thread structure and the drawn carbon nanotube films winding around the conductive thread structure by van der Waals force therebetween, or can include the conductive thread structure and the untwisted carbon nanotube wires wrapping around the conductive thread structure via van der Waals force therebetween. The carbon nanotube layer in the carbon nanotube composite wire structure is composed of carbon nanotubes. Most of the carbon nanotubes can be located on the surface of the conductive thread structure, and most of the adjacent carbon nanotubes substantially extending along a same direction can be joined end-to-end via van der Waals force therebetween. Furthermore, most of the carbon nanotubes can substantially spirally extend along the axis of the conductive thread structure, and most of the carbon nanotubes and the axis of the conductive thread structure cooperatively define an angle larger than 0 degrees and less than or equal to 90 degrees. Carbon nanotubes in each of the drawn carbon nanotube films or each of the untwisted carbon nanotube wires substantially extend along a same direction. The angles defined between most of the carbon nanotubes in the carbon nanotube composite wire structure and the axial of the conductive thread structure can be substantially equal to each other.

If the carbon nanotube layer in the carbon nanotube composite wire structure comprises flocculated carbon nanotube films, the flocculated carbon nanotube films can be combined by van der Waals force therebetween and wrap around the entire surface of the conductive thread structure. The flocculated carbon nanotube film can be composed of a plurality of carbon nanotubes entangled with each other. The carbon nanotubes can be substantially tightly and uniformly positioned on the surface of the conductive thread structure.

If the carbon nanotube layer in the carbon nanotube composite wire structure comprises pressed carbon nanotube films, the pressed carbon nanotube films can be tightly joined via van der Waals force therebetween and wrap around the entire surface of the conductive thread structure. If the pressed carbon nanotube film includes a plurality of disordered carbon nanotubes, the carbon nanotubes can be disorderly, uniformly, and tightly arranged along the axial direction of the conductive thread structure. The pressed carbon nanotube film includes carbon nanotubes substantially resting upon each other. The carbon nanotubes can be uniformly and tightly arranged along the axis of the conductive thread structure, and adjacent carbon nanotubes are attracted to each other and combined by van der Waals attractive force. An angle between a primary alignment direction of the carbon nanotubes and a surface of the conductive thread structure can be 0 degrees to approximately 15 degrees.

If the carbon nanotube layer in the carbon nanotube composite wire structure comprises twisted carbon nanotube wire, the twisted carbon nanotube wire can be tightly combined via van der Waals force therebetween and can be wound substantially around the entire surface of the conductive thread structure without gaps. The carbon nanotubes in the twisted carbon nanotube wire can be uniformly positioned on the surface of the conductive thread structure.

The carbon nanotubes have excellent mechanical properties such as toughness, and can improve the mechanical properties of the composited materials. The carbon nanotubes are uniformly located on the surface of the conductive thread structure by van der Waals force. The carbon nanotube composite wire structure including the carbon nanotubes are especially tough and can have good mechanical properties. If tension is applied to the carbon nanotube composite wire, friction forces can be formed between the carbon nanotubes and the conductive thread structure. The friction forces can aid in preventing the conductive thread structure from being broken. The carbon nanotube composite wire structure can be lengthened from about 5% to about 10% times the length of the conductive thread structure. Properties of the carbon nanotube composite wire structure are not only related to the properties of the conductive thread structure, but also affected by the structure and weight of the carbon nanotube layer.

A method for making the above mentioned carbon nanotube composite wire structure is provided. The method includes the following steps:

(a), providing the conductive thread structure and the carbon nanotube structure; and (b), winding the carbon nanotube structure around the conductive thread structure.

The step (b) can include the following steps: (b1), adhering one end of the carbon nanotube structure to the conductive thread structure; and (b2), rotating the conductive thread structure with the carbon nanotube structure, and simultaneously moving the conductive thread structure or the carbon nanotube structure along a fixed direction.

It can be understood that the step (b) can further include collecting the carbon nanotube composite wire structure.

In one embodiment, if the carbon nanotube structure is drawn carbon nanotube film or untwisted carbon nanotube wire, the step (a) can include providing the conductive thread structure and at least one carbon nanotube array, and drawing a carbon nanotube film or an untwisted carbon nanotube wire from the carbon nanotube array to form the carbon nanotube structure. The step (b) can include attaching the carbon nanotube structure to the conductive thread structure, and rotating the conductive thread structure or the carbon nanotube structure to wind the carbon nanotube structure around the conductive thread structure. While winding the carbon nanotube structure, the carbon nanotube structure can be continuously drawn from the at least one carbon nanotube array.

Figure 6:
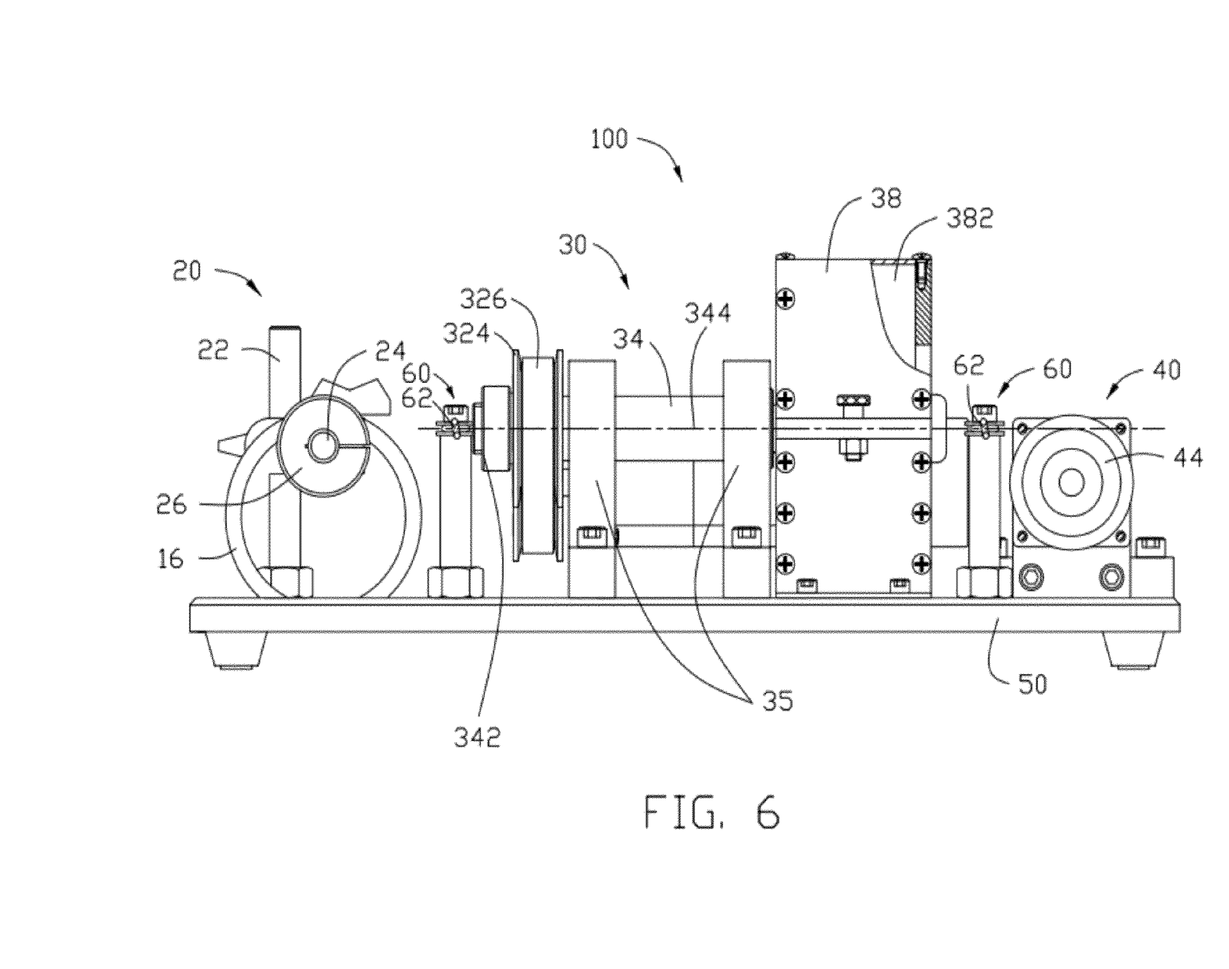
FIG. 6 is a front view of one embodiment of an apparatus partially cut-away for making a carbon nanotube composite wire structure.
Figure 7:
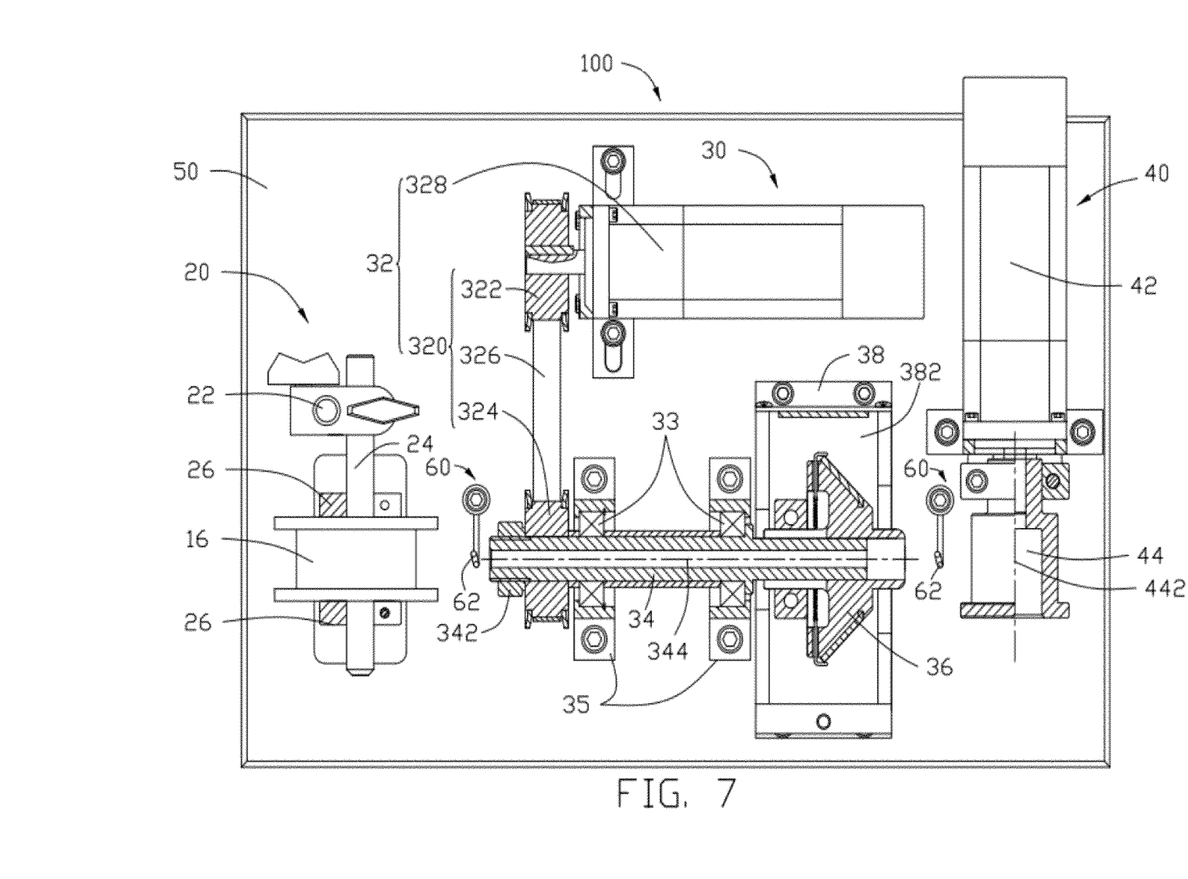
FIG. 7 is a top view of the apparatus shown in FIG. 6 partially cut-away.
Figure 8:
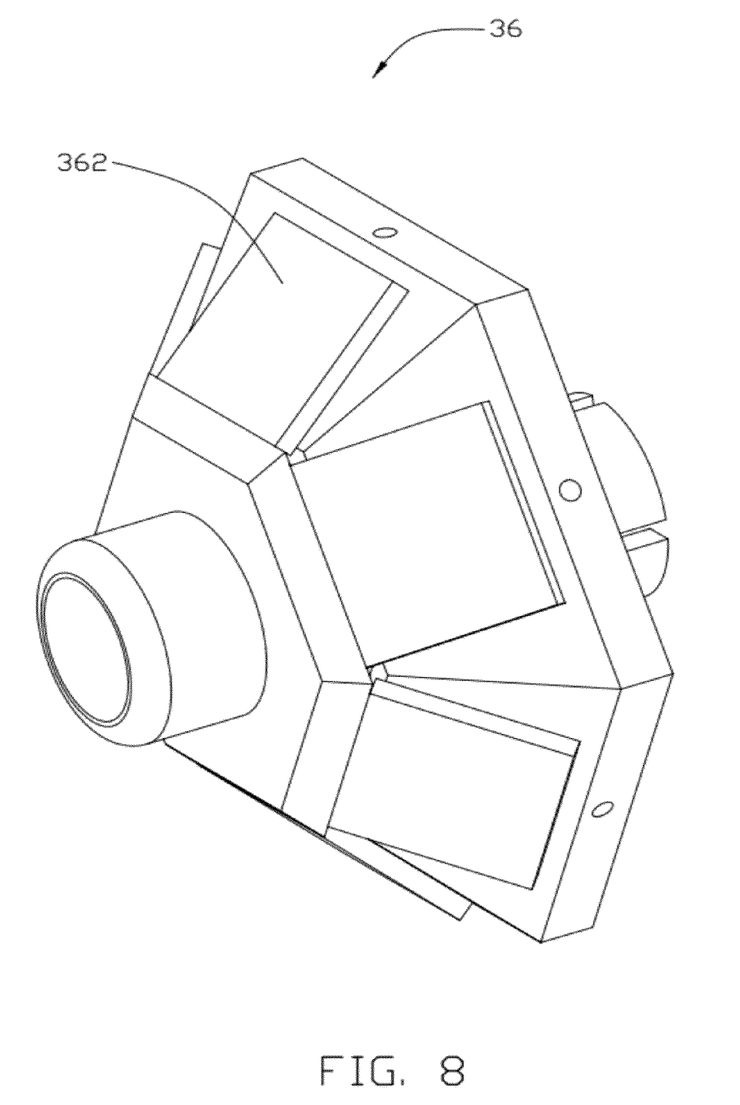
FIG. 8 is an isometric view of a face plate of the apparatus shown in FIG. 6.

Referring to FIG. 6, FIG. 7, and FIG. 8, one embodiment of an apparatus 100 for making a carbon nanotube composite wire structure is provided. The apparatus 100 can include a supply unit 20, a wrapping unit 30, a collecting unit 40, and a support 50. The supply unit 20 supplies a linear structure. The wrapping unit 30 can load at least one carbon nanotube array thereon. A carbon nanotube structure (not shown) can be drawn from the at least one carbon nanotube array. The carbon nanotube structure can be at least one drawn carbon nanotube film, at least one untwisted carbon nanotube wire, or a combination thereof. The wrapping unit 30 is to wrap the carbon nanotube structure around the linear structure, thereby forming the carbon nanotube composite wire structure. The collecting unit 40 can drive the linear structure to move along a fixed direction and collect the carbon nanotube composite wire structure. The support 50 can support the supply unit 20, the wrapping unit 30, and the collecting unit 40.

The support 50 can be a planar structure. The supply unit 20, the wrapping unit 30, and the collecting unit 40 can be fixed on a same surface of the support 50. The support 50 can be made of metal such as steel or aluminum.

The supply unit 20 can include a pedestal 22, a guiding shaft 24, a bobbin 16, and two collars 26. The pedestal 22 is substantially perpendicular to the support 50 by fixing one end of the pedestal 22. One end of the guiding shaft 24 is fixed on the pedestal 22, and the other end is suspended. The guiding shaft 24 is substantially perpendicular to the pedestal 22. The bobbin 16 is hung on the guiding shaft 24, and can be freely moved around the guiding shaft 24. The bobbin 16 is for winding a linear structure thereon. The linear structure can be a conductive thread structure or a non-conductive thread structure. The non-conductive thread structure can be a carbon fiber, an artificial fiber such as Kevlar, or a natural fiber. The natural fiber can be spider silk or silkworm silk. The conductive thread structure can be a metal thread, a conductive polymer thread, or a combination thereof. The two collars 26 can be mounted on the guiding shaft 24 and fixed at two opposite sides of the bobbin 16 to prevent the bobbin 16 from falling from the guiding shaft 24. The number of the collar 26 is not restricted to two, and can be one, three, or more, provided the bobbin 16 is hung at the guiding shaft 24.

The wrapping unit 30 can be configured to load a carbon nanotube array with a growing substrate for growing the carbon nanotube array. The wrapping unit 30 can include a drive mechanism 32, a hollow rotating shaft 34, two bearings 33, two braces 35, a face plate 36, and a covering element 38. The drive mechanism 32 is positioned at one end of the hollow rotating shaft 34 close to the supply unit 20. The face plate 36 is located at the other end of the hollow rotating shaft 34. The two bearings 35 are separately harnessed to the hollow rotating shaft 34. Each brace 35 is coupled with a bearing 33 to support the hollow rotating shaft 34.

The drive mechanism 32 drives the hollow rotating shaft 34 to rotate. The hollow rotating shaft 34 is rotated to allow the face plate 36 to rotate. The drive mechanism 32 can include an actuator 320 and a first motor 328. The actuator 320 is driven by the first motor 328. The actuator 320 can include a first belt pulley 322, a second belt pulley 324, and a belt 326. The first belt pulley 322 is mounted on the first motor 328. The second belt pulley 324 is separated from the first belt pulley 322, and mounted on the hollow rotating shaft 34. The belt 326 is harnessed to the first belt pulley 322 and the second belt pulley 324. The first belt pulley 322 can be rotated under the first motor 328. The first belt pulley 322 can drive the second belt pulley 324 to rotate by the belt 328. The second belt pulley 324 drives the hollow rotating shaft 34 to rotate. Therefore, a speed of the first motor 328 can control a rotating speed of the hollow rotating shaft 34. The structure of the drive mechanism 32 is not restricted by the above description, provided the drive mechanism 32 can drive the hollow rotating shaft 34 to rotate.

The hollow rotating shaft 34 is substantially parallel to the support 50. A block nut 342 is screwed on one end of the hollow rotating shaft 34 close to the second belt pulley 324. The block nut 342 is positioned on the hollow rotating shaft 34 close to the supply unit 20 to prevent the second belt pulley 324 from falling off. The hollow rotating shaft 34 defines an invisible axis 344. The invisible axis 344 can substantially overlap with the linear structure when the linear structure passes through the hollow rotating shaft 34. The invisible axis 344 and the highest position of the guiding shaft 34 are kept substantially on the same line. In this content, "the highest position" is assigned to the longest distance between the hollow rotating shaft 34 and the support 50. The hollow rotating shaft 34 can be rotated clockwise or anti-clockwise around the invisible axis 344 by the driving mechanism 32.

The two braces 35 are fixed on the support 50 and separately located between the driving mechanism 32 and the face plate 36. The second belt pulley 324 is positioned between one of the two braces 35 and the block nut 342. Thus, the second belt pulley 324 cannot move along the extending direction of the hollow rotating shaft 34.

The face plate 36 is suspended over the support 50 and harnessed on the hollow rotating shaft 34. As such, the face plate 36 can accompany the hollow rotating shaft 34 to rotate around the invisible axis 344. The hollow rotating shaft 34 is driven by the first motor 328, such that the rotating speed of the face plate 36 is controlled by the motor 328. The shape of the face plate 36 is similar to a frustum pyramid, such as a triangular frustum pyramid, a quadrangular frustum pyramid, a pentangular frustum pyramid, a hexangular frustum pyramid, or a heptangular frustum pyramid. The face plate 36 has a plurality of side surfaces. A support stage 362 protrudes from each side surface. A plurality of support stages 362 loads the carbon nanotube array. Each support stage 362 can define an angle with the invisible axis 344, and can face the collecting unit 40. A plurality of support stages 362 uniformly surrounds the hollow rotating shaft 34. In one embodiment, the shape of the face plate 36 is similar to a hexangular frustum pyramid. Six support stages 362 protrude from the side surfaces of the hexangular frustum pyramid. Each support stage 362 can define the angle of about 45 degrees with the invisible axis 344.

The covering element 38 can define a chamber 382 therein to receive the face plate 36. Thus, the covering element 38 can prevent the carbon nanotube arrays from being thrown off from the face plate 36. The covering element 38 can also keep the carbon nanotube arrays free from dust and other contaminations. It can be understood that the covering element 38 is a selected structure.

The collecting unit 40 is fixed on the support 50 close to the face plate 36. The collecting unit 40 can include a second motor 42 and a collecting shaft 44 fixed on the second motor 42. The collecting shaft 44 is suspended over the support 50. The collecting shaft 44 defines an invisible axis 442 substantially perpendicular to the invisible axis 344 of the hollow rotating shaft 34. The highest point of the collecting shaft 44 from the support 50 is substantially kept at a same line with the invisible axis 344. The collecting shaft 44 can rotate around the invisible axis 442 under the second motor 42. As such, the linear structure can be driven along a line, and the carbon nanotube composite wire structure can be collected on the surface of the collecting shaft 44. Therefore, the second motor 42 can control the rotating speed of the collecting shaft 44. The second motor 42 can also control the collecting speed of the carbon nanotube composite wire structure.

The apparatus 100 can further include two locating elements 60. Each locating element 60 defines a locating hole. The center of the locating hole and the invisible axis 344 of the hollow rotation shaft 34 are substantially maintained at a same line. The two locating elements 60 are configured to ensure the linear structure is sustained at substantially a same plane and does not contact the inner wall of the hollow rotation shaft 34. One locating element 60 is fixed between the supply unit 20 and the wrapping unit 30, thus the linear structure is suspended in the hollow rotation shaft 34. The other locating element 60 is positioned between the wrapping unit 30 and the collecting unit 40, thus the carbon nanotube composite wire structure made by the apparatus 100 and the highest position of the collecting shaft 44 can substantially stay on the same plane. The number of the locating element 60 can be selected as desired.

A method for making a carbon nanotube composite wire structure using the apparatus 100 can include the following steps:

S10, providing a linear structure using the supply unit 20;

S20, passing the linear structure through the wrapping unit 30, and fixing the linear structure on the collecting unit 40;

S30, providing a carbon nanotube structure by the wrapping unit 30, and adhering one end of the carbon nanotube structure to the linear structure; and S40, rotating the face plate 36 and moving the linear structure along a fixed direction to wind the carbon nanotube structure around the linear structure.

The step S10 can include the steps: winding the linear structure around the bobbin 16; hanging the bobbin 16 with the linear structure on the guiding shaft 24; and limiting the bobbin 16 between the two collars 26. The bobbin 16 with the linear structure coiled thereon can be moved around the guiding shaft 24.

The step S20 can include the steps: passing a free end of the linear structure through the hollow rotation shaft 34; and fixing the free end of the linear structure on the surface of the collecting shaft 44. It can be understood that the linear structure can pass through the two locating holes 62 in sequence before the linear structure is fixed on the collecting shaft 44. The linear structure substantially overlaps the invisible axis 344.

In one embodiment, the carbon nanotube structure can be at least one drawn carbon nanotube film, at least one untwisted carbon nanotube wire, or combinations thereof, and the step S30 can include the following sub-steps:

S31, providing at least one carbon nanotube array grown on a growing substrate;

S32, fixing the growing substrate on the face plate 36; and

S33, drawing a drawn carbon nanotube film or an untwisted carbon nanotube wire from each carbon nanotube array using a stretching tool, and adhering one end of the carbon nanotube film or the untwisted carbon nanotube wire to the linear structure.

In step S31, the carbon nanotube array is composed of a plurality of carbon nanotubes. The plurality of carbon nanotubes can be single-walled carbon nanotubes, double-walled nanotubes, multi-walled carbon nanotubes, or any combination thereof. In one embodiment, the plurality of carbon nanotubes comprises substantially parallel multi-walled carbon nanotubes. The carbon nanotube array is essentially free of impurities such as carbonaceous or residual catalyst particles. The carbon nanotube array can be a super aligned carbon nanotube array. A method for making the carbon nanotube array is unrestricted, and can be by chemical vapor deposition methods or other methods.

In step S32, each growing substrate with the carbon nanotube array grown thereon is fixed on the support stage 362 by adhesive, mechanical tools or vacuum absorption.

In step S33, each carbon nanotube film or untwisted carbon nanotube wire can be formed by selecting one or more carbon nanotubes having a predetermined width from each carbon nanotube array, and pulling the carbon nanotubes at a substantially uniform speed to form carbon nanotube segments that are joined end to end to achieve the uniform drawn carbon nanotube film or untwisted carbon nanotube wire. During the pulling process, as the initial carbon nanotube segments are drawn out, other carbon nanotube segments are also drawn out end to end due to van der Waals force between ends of adjacent segments. The stretching tool can be a ruler, tweezers, or an adhesive tape.

It is noted that because the carbon nanotubes in the carbon nanotube array have a high purity and a high specific surface area, the drawn carbon nanotube film or untwisted carbon nanotube wire is adhesive. As such, the carbon nanotube film or untwisted carbon nanotube wire can be adhered to the surface of the linear structure directly and a plurality of drawn carbon nanotube films or untwisted carbon nanotube wires can be adhered to a surface one after another.

It is noted that the covering element 38 is opened to expose the face plate 36 to surroundings in step S32 and step S33.

The step S40 can include: operating the drive mechanism 32 to rotate the face plate 36, and simultaneously controlling the collecting unit 40 to pull the linear structure along a line, such that the carbon nanotube structure winds around the linear structure. Specifically, the second motor 42 is operated to drive the collecting shaft 44 to rotate around the invisible axis 442 thereof, such that the linear structure can be continuously supplied by the supply unit 20 and move towards the collecting shaft 44. As such the drawn carbon nanotube film or untwisted carbon nanotube wire can be continuously drawn from each carbon nanotube array. Simultaneously, the first motor 328 is operated to make the actuator 320 move along a predetermined direction, such that the hollow rotating shaft 34 is rotated around the invisible axis 344 thereof. Thus, the face plate 36 is rotated around the invisible axis 344 of the hollow rotating shaft 34, and the at least one carbon nanotube array located on the face plate 36 is also rotated around the invisible axis 344 of the hollow rotating shaft 34. As such, the drawn carbon nanotube film or the untwisted carbon nanotube wire is stretched from each carbon nanotube array, and wrapped around the surface of the linear structure, thereby forming the carbon nanotube composite wire structure. If the second motor 42 drives the collecting shaft 44 to rotate, the carbon nanotube composite wire can automatically wind around the collecting shaft 44. Thus, the carbon nanotube composite wire can be continuously manufactured and automatically collected on the collecting shaft 44. It is noted that when the wrapped unit 30 is operated, the covering element 38 should keep in a close situation to make sure the face plate 36 is covered by the covering element 38.

It can be understood that if the face plate 36 is maintained at a certain rotating speed, the quicker the collecting shaft 44 rotates, the quicker the speed of the collecting shaft 44 driving the linear structure. The linear structure can move quicker, the thinner the carbon nanotube layer in the carbon nanotube composite wire structure. If the face plate 36 is sustained at a certain rotating speed, the more slowly the collecting shaft 44 rotates, the slower the collecting shaft 44 drives the linear structure, the linear structure can move slowly, such that the thicker the carbon nanotube layer in the carbon nanotube composite wire structure. If the collecting shaft 44 is maintained at a certain speed, the quicker the face plate 36 rotates, the quicker the speed of the carbon nanotube structure is wound on the linear structure, the thicker carbon nanotube layer in the carbon nanotube composite wire structure. If the collecting shaft 44 is maintained at a certain speed, the slower the face plate 36 rotates, the slower the speed of the carbon nanotube structure is wound on the linear structure, and the thinner the carbon nanotube layer in the carbon nanotube composite wire structure. Therefore, the rotating speeds of the collecting shaft 44 and the face plate 36 cooperatively affect the thickness of the carbon nanotube layer. Thus, the thickness of the carbon nanotube layer can be controlled by the work speeds of the second motor 42 and the first motor 328.

Therefore, the apparatus 100 can continuously produce the carbon nanotube composite wire structure and be applied in industry.

The disclosure can be further set forth by an example of a carbon nanotube gold thread composite wire structure.

Figure 9:
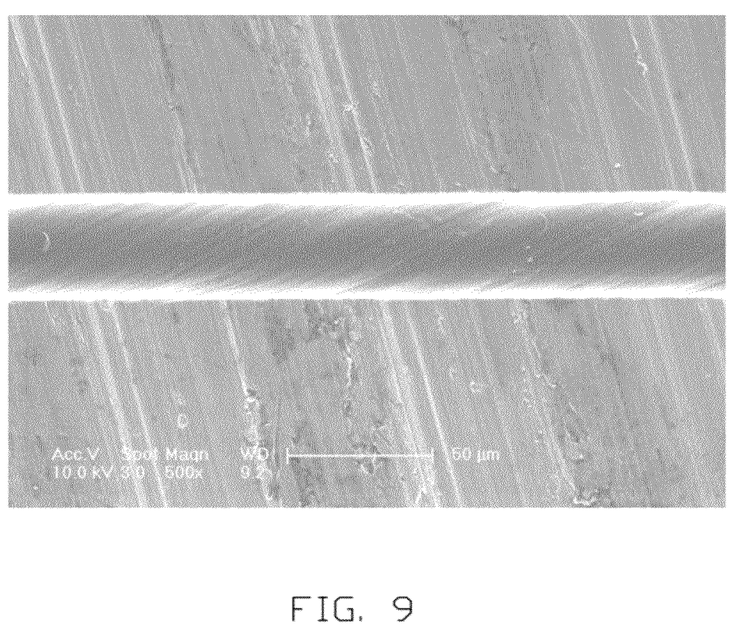
FIG. 9 shows an SEM image of one embodiment of a carbon nanotube composite wire structure.
Figure 10:
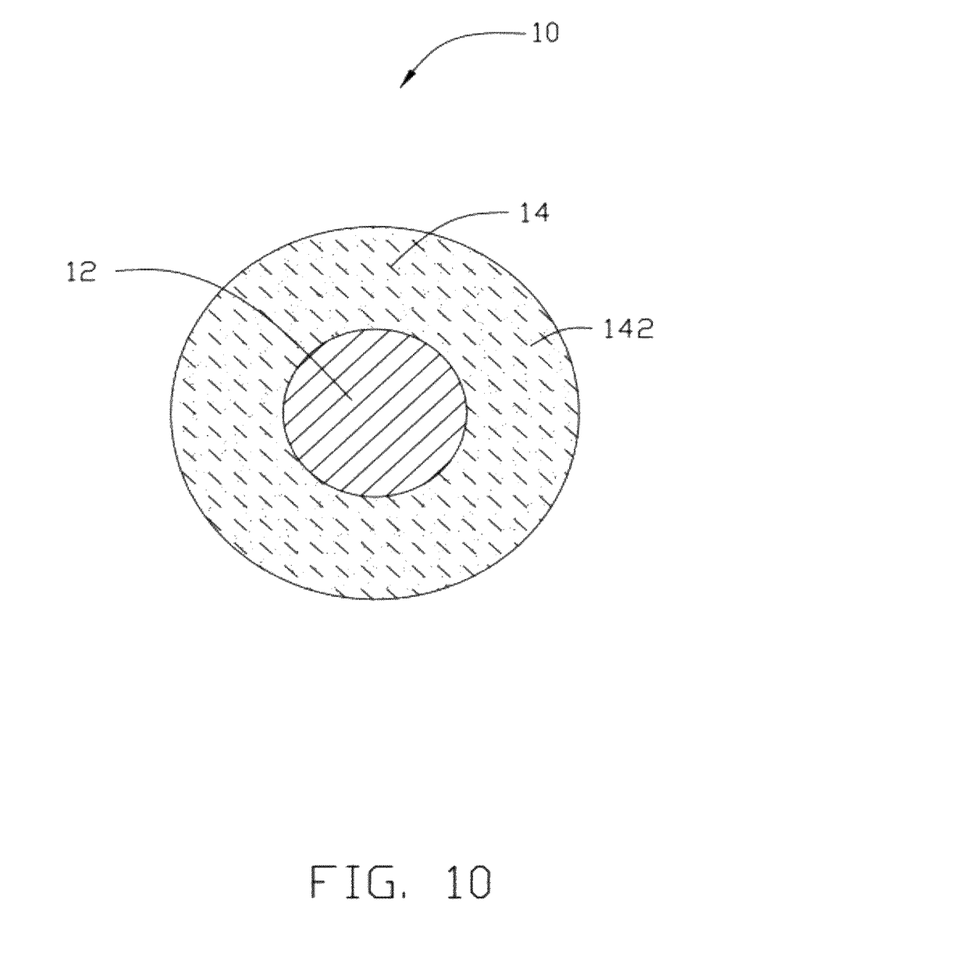
FIG. 10 is a cross-sectional view of the carbon nanotube composite wire structure shown in FIG. 9.

Referring to FIG. 9 and FIG. 10, one embodiment of a carbon nanotube gold thread composite wire structure 10 is provided. The carbon nanotube gold thread composite wire structure 10 has a diameter of about 40 μm. The carbon nanotube gold thread composite wire structure 10 consists of a gold thread 12 with a diameter of about 18 μm and a carbon nanotube layer 14 surrounding the gold thread 12. The carbon nanotube layer 14 is composed of a plurality of carbon nanotubes 142. The carbon nanotubes 142 are tightly and uniformly located on the surface of the gold thread 12. The carbon nanotube layer 14 winds around the gold thread 12 from one end of the gold thread 12 to the other opposite end of the gold thread 12.

Specifically, six drawn carbon nanotube films spiraling about the gold thread 12 upwards along the axial direction of the gold thread 12 form the carbon nanotube gold thread composite wire structure 10. Most of the carbon nanotubes 142 arranged along a same direction are joined end-to-end via van der Waals force. The six drawn carbon nanotube films wrap the entire surface of the gold thread 12 across the lengthwise direction of the gold thread 12.

Furthermore, most of the carbon nanotubes 142 spirally extend along the axis of the gold thread 12. Most of the carbon nanotubes 142 and the axis of the gold thread 12 cooperatively define an angle (not labeled) of about 45 degrees. In addition, most of the carbon nanotubes 142 in each drawn carbon nanotube film substantially extend along a same direction, as such angles defined between most of the carbon nanotubes 142 and the axis of the gold thread 12 have the same degrees.

The carbon nanotube gold thread composite wire structure 10 has good mechanical properties, especially toughness. The carbon nanotube gold thread composite wire structure 10 can be lengthened from about 5% to about 10% of the length of the gold thread 12.

Figure 11:
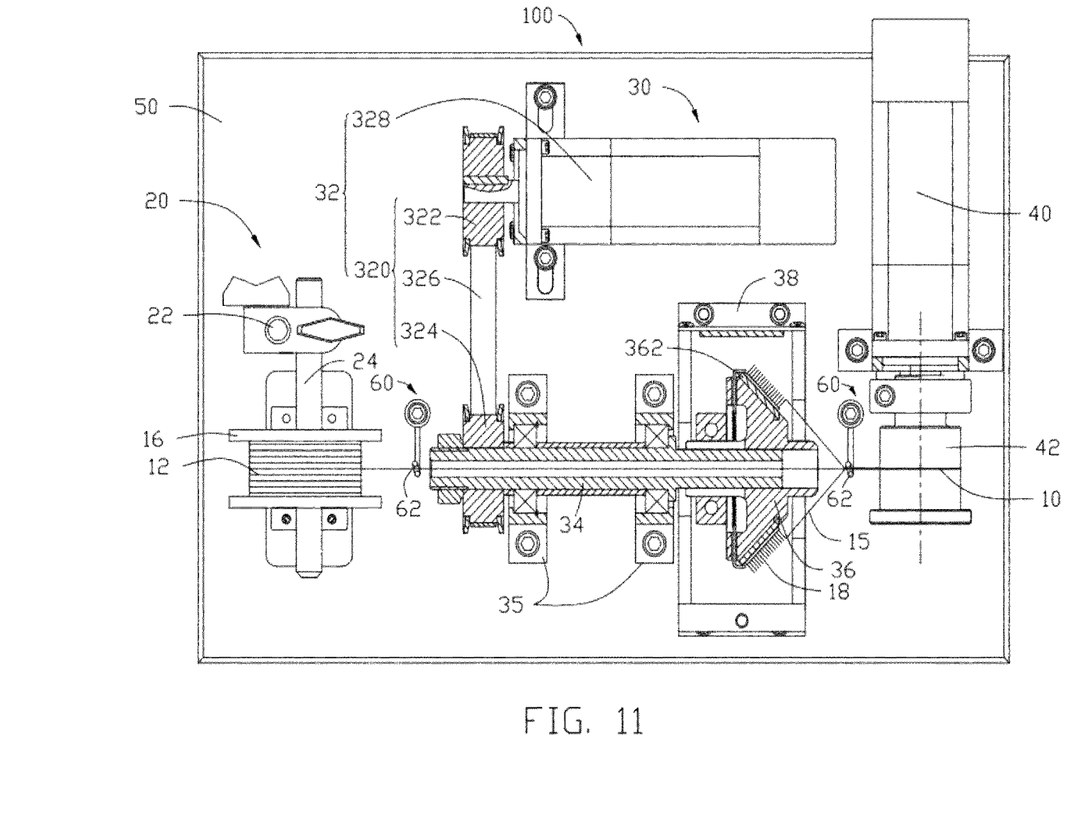
FIG. 11 illustrates one embodiment of a method for making a carbon nanotube composite wire structure using the apparatus shown in FIG. 6.

Referring to FIG. 11, a method for making the carbon nanotube gold thread composite wire structure 10 is provided. The method can include providing the gold thread 12 and the carbon nanotube structure, and winding the carbon nanotube structure around the gold thread 12. The method can be performed by using the apparatus 100. Specifically, the method realized using the apparatus 10 can include the following steps:

S100, providing the gold thread 12 using the supply unit 20;

S200, passing the gold thread 12 through the hollow rotation shaft 34 and fixing the free end of the gold thread 12 on the collecting shaft 44;

S300, forming six drawn carbon nanotube films 15 by the wrapping unit 30, and adhering the six drawn carbon nanotube films 15 to the gold thread 12; and S400, rotating the face plate 36, and simultaneously rotating the collecting shaft 44.

In step S100, the gold thread 12 winds around the bobbin 16. The bobbin 16 with the gold thread 12 coiled is hung on the guiding shaft 24 and fixed between the two collars 26.

The step S200 can be performed by pulling the gold thread 12 from the bobbin 16, passing the gold thread 12 through one of the two locating holes 62, the hollow rotation shaft 34, and the other locating hole 62 in sequence, and fixing the free end of the gold thread 12 on the collecting shaft 44. The gold thread 12 substantially overlaps with the invisible axis 344 of the hollow rotating shaft 34.

In step S300, the six carbon nanotube arrays 18 with growing substrates (not labeled) are provided. The covering element 38 is opened to expose the face plate 36. The six growing substrates are adhered to the support stages 362 one by one using double faced adhesive tape. The six drawn carbon nanotube films 15 are orderly drawn from the six carbon nanotube arrays 18. Next, the six drawn carbon nanotube films 15 are adhered to the gold thread 12. The covering element 38 is then closed to cover the face plate 36 in the chamber 382 of the covering element 38.

The step S400 can include: operating the drive mechanism 32 to rotate the face plate 36, and controlling the collecting unit 40 to move the gold thread 12 along a line, such that the six drawn carbon nanotube films 15 can spirally wind around the gold thread 12. Specifically, the second motor 42 and first motor 328 are operated. The collecting shaft 44 is rotated clockwise around the invisible axis 442 of the collecting shaft 44. The gold thread 12 is continuously pulled out and moved towards the collecting unit 40, and simultaneously the six drawn carbon nanotube films 15 are continuously drawn from the six carbon nanotube arrays 18, and the first motor 328 drives the actuator 320. The actuator 320 drives the hollow rotating shaft 34 to rotate around the invisible axis 344 of the hollow rotating shaft 34. The hollow rotating shaft 34 drives the face plate 36 to rotate around the invisible axis 344. The six carbon nanotube arrays 18 and the six carbon nanotube films 15 are rotated around the invisible axis 344 accompanying the rotation of the face plate 36. The moving direction of the gold thread 12 can be substantially perpendicular to the rotation of the face plate 36. The six drawn carbon nanotube films 15 spirally wind around the gold thread 12, thereby forming the carbon nanotube gold thread composite wire structure 10. The carbon nanotube gold thread composite wire structure 10 automatically winds around the collecting shaft 44 as the collecting shaft 44 rotates. Thus, when the collecting unit 40 and the wrapping unit 30 are operating, the gold thread 12 can be continuously pulled, the six drawn carbon nanotube films 15 can be continuously drawn from the carbon nanotube arrays 18 and wind around the gold thread 12, and the carbon nanotube gold thread composite wire structure 10 is continuously wrapped on the collecting shaft 44. Therefore, the carbon nanotube composite wire is continuously manufactured.

In one embodiment, the carbon nanotube composite wire structure can be a carbon nanotube aluminum thread composite wire structure with a diameter of about 50 μm. The carbon nanotube aluminum thread composite wire structure can include an aluminum thread with the diameter of about 25 μm and a plurality of carbon nanotubes spirally arranged along the axial direction of the aluminum thread.

According to the above descriptions, the carbon nanotube composite wire structure, and the method and apparatus for making the carbon nanotube composite wire structure of the present disclosure have the following advantages.

First, because the carbon nanotubes 142 have excellent mechanical properties and can be a good strengthening material, the carbon nanotubes 142 are uniformly positioned around the gold thread 12, and as such the carbon nanotube gold thread composite wire structure 10 has good mechanical properties. For example, the carbon nanotube gold thread composite wire structure 10 can be lengthened from 5% to 10% of the length of the gold thread 12. Therefore, the carbon nanotube gold thread composite wire structure 10 can be widely applied, such as acting as a conductive wire.

Second, the carbon nanotube gold thread composite wire structure 10 can be made by winding the carbon nanotube structure around the gold thread 12, so the method is simple and easy to produce. In addition, in the method, the liquid agent is unnecessary and the carbon nanotube structure and the gold thread 12 are macroscopic, therefore the method is friendly to the environment.

Third, the apparatus 10 includes the face plate 36 and the collecting shaft 44. The face plate 36 is rotated around the invisible axis 344 of the hollow rotating shaft 34. The collecting shaft 44 is rotated around the invisible axis 442 thereof. Thus, the carbon nanotube structure can be automatically wound around the linear structure, and the carbon nanotube composite wire structure can be automatically collected on the collecting shaft 44. Therefore, the apparatus 10 can continuously and automatically produce and collect the carbon nanotube composite wire structure. The method for making the carbon nanotube composite wire structure is simple and environmentally friendly. Thus, the carbon nanotube composite wire structure can be practical in industry.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. An apparatus for making a carbon nanotube composite wire structure, the apparatus comprising a wrapping unit;
   a supply unit configured to feed a linear structure to the wrapping unit; and
   a collecting unit configured to pull the linear structure and collect the carbon nanotube composite wire structure formed on the wrapping unit, wherein
   the wrapping unit comprising:
      a hollow rotating shaft defining an axis, wherein the supply unit is adapted to feed the linear structure through the hollow rotating shaft; a growing substrate with a carbon nanotube array;
      a face plate mounted on the hollow rotating shaft, wherein a shape of the face plate is a frustum pyramid, the frustum pyramid includes a plurality of side surfaces configured to load the carbon nanotube array growing on the growing substrate, the carbon nanotube array being used to form a carbon nanotube structure; and
      a drive mechanism configured to drive the hollow rotating shaft rotating around the axis, and wind the carbon nanotube structure around the linear structure to form the carbon nanotube composite wire structure.

2. The apparatus of claim 1, wherein the supply unit comprises a pedestal, a guiding shaft fixed on the pedestal, and a bobbin hung on the guiding shaft and movable around the guiding shaft, wherein the supply unit feeds the linear structure winded on the bobbin to the wrapping unit.

3. The apparatus of claim 2, wherein the supply unit further comprises a collar mounted on the guiding shaft to ensure that the bobbin is hung on the rotating shaft.

4. The apparatus of claim 1, wherein the face plate further comprises a support stage protruding from each of the plurality of side surfaces to load the carbon nanotube array thereon.

5. The apparatus of claim 4, wherein the support stage faces the collecting unit, and an angle is defined between the support stage and the axis of the hollow rotating shaft, and the angle is about 45 degrees.

6. The apparatus of claim 1, wherein the drive mechanism comprises a first motor and an actuator mounted on the first motor and driven by the first motor.

7. The apparatus of claim 6, wherein the actuator comprises a first belt pulley located on the first motor, a second belt pulley located on one end of the hollow rotating shaft, and a belt harnessed on the first belt pulley and the second belt pulley.

8. The apparatus of claim 1, wherein the wrapping unit further comprises a brace mounted on the hollow rotating shaft to support the hollow rotating shaft, and a bearing positioned in the brace.

9. The apparatus of claim 1, wherein the wrapping unit further comprises a covering element, the covering element is configured to cover the face plate, and to prevent the carbon nanotube array from throwing off from the face plate and from environmental contamination.

10. The apparatus of claim 1, wherein the collecting unit comprises a second motor and a collecting shaft mounted on the second motor, and the second motor is configured to drive the collecting shaft.

11. The apparatus of claim 10, wherein the collecting shaft is substantially perpendicular to the hollow rotating shaft.

12. The apparatus of claim 1, further comprising a locating element defining a locating hole, wherein a center of the locating hole and an invisible axis of the hollow rotating shaft are substantially kept at a same line.

13. The apparatus of claim 12, wherein the locating element is fixed between the supply unit and the wrapping unit.

14. The apparatus of claim 12, wherein the locating element is fixed between the collecting unit and the wrapping unit.

15. The apparatus of claim 1, further comprising a support supporting the supply unit, the wrapping unit, and the collecting unit.

16. An apparatus for making a carbon nanotube composite wire structure, the apparatus comprising:
   a supply unit configured to provide a linear structure;
   a wrapping unit comprising a growing substrate with a carbon nanotube array, and a support stage to load the growing substrate with the carbon nanotube array growing thereon, wherein the wrapping unit continuously draws a carbon nanotube structure from the carbon nanotube array, and simultaneously winds the carbon nanotube structure around the linear structure to form the carbon nanotube composite structure; and
   a collecting unit pulling the linear structure along a fixed direction and collecting the carbon nanotube composite wire structure.

17. The apparatus of claim 16, wherein the wrapping unit further comprises a face plate comprising the support stage, and the face plate is rotated such that the support stage is rotated.

18. The apparatus of claim 17, wherein the collecting unit comprises a collecting shaft rotatable around an axis thereof, such that the linear structure is pulled along the fixed direction and the carbon nanotube composite structure is wrapped around the collecting shaft.

\* \* \* \* \*